(12) United States Patent
Joerger et al.

(10) Patent No.: US 12,437,394 B2
(45) Date of Patent: Oct. 7, 2025

(54) METHOD FOR PROVIDING A LABEL OF A BODY PART ON AN X-RAY IMAGE

(71) Applicant: Siemens Healthineers AG, Forchheim (DE)

(72) Inventors: Clemens Joerger, Forchheim (DE); Sven-Martin Sutter, Herzogenaurach (DE); Jing Tai Cao, Shanghai (CN); Xi Shuai Peng, Shanghai (CN)

(73) Assignee: Siemens Healthineers AG, Forchheim (DE)

( * ) Notice: Subject to any disclaimer, the term of this patent is extended or adjusted under 35 U.S.C. 154(b) by 386 days.

(21) Appl. No.: 17/873,566

(22) Filed: Jul. 26, 2022

(65) Prior Publication Data

US 2023/0031744 A1 Feb. 2, 2023

(30) Foreign Application Priority Data

Jul. 29, 2021 (EP) ..................... 21188432

(51) Int. Cl.
*G06T 7/00* (2017.01)
(52) U.S. Cl.
CPC .. *G06T 7/0012* (2013.01); *G06T 2207/10116* (2013.01); *G06T 2207/20081* (2013.01); *G06T 2219/004* (2013.01)
(58) Field of Classification Search
CPC ......... G06T 7/0012; G06T 2207/10116; G06T 2207/20081; G06T 2219/004; G06F 18/25; G06V 2201/03
See application file for complete search history.

(56) References Cited

U.S. PATENT DOCUMENTS

| | | | |
|---|---|---|---|
| 2015/0347717 A1* | 12/2015 | Dalal | G16H 20/30 434/258 |
| 2017/0112460 A1* | 4/2017 | Merckx | A61B 6/542 |
| 2021/0121244 A1* | 4/2021 | Innanje | A61B 34/10 |
| 2022/0334243 A1* | 10/2022 | DeAngelus | G06V 10/454 |
| 2022/0343676 A1 | 10/2022 | Bakki et al. | |
| 2023/0196617 A1* | 6/2023 | Zheng | G06T 7/75 382/159 |
| 2024/0013415 A1* | 1/2024 | Tam | G06V 40/10 |

FOREIGN PATENT DOCUMENTS

| | | |
|---|---|---|
| CN | 110946597 A | 4/2020 |
| EP | 3788962 A1 | 3/2021 |

* cited by examiner

*Primary Examiner* — Santiago Garcia
(74) *Attorney, Agent, or Firm* — Harness, Dickey & Pierce, P.L.C.

(57) ABSTRACT

One or more example embodiments relates to a computer-implemented a method for providing a label of a body part on an X-ray image, comprising receiving input data, wherein the input data is based on a red, green and blue (RGB) image of the body part, a depth image of the body part and an X-ray image of the body part; applying at least one trained function to the input data to generate output data, wherein the output data is the label of the body part, the label indicating a right body part or a left body part; and providing the output data.

21 Claims, 3 Drawing Sheets

METHOD FOR PROVIDING A LABEL OF A BODY PART ON AN X-RAY IMAGE

CROSS-REFERENCE TO RELATED APPLICATION(S)

The present application claims priority under 35 U.S.C. § 119 to European Patent Application No. 21188432.5, filed Jul. 29, 2021, the entire contents of each of which are incorporated herein by reference.

FIELD

One or more example embodiments of the present invention relate to a method for providing a label of a body part on an X-ray image, wherein mistakes with in the labeling process can be reduced.

BACKGROUND

In general, digital X-ray systems provide an X-ray image of a body part or an examination region in general. The body part or the examination region is positioned between an X-ray source and an X-ray detector. An X-ray image is acquired.

During X-ray examinations for paired body parts, especially extremities, the user needs to indicate on the X-ray image with an R/L label, if the right or left body part is shown in the X-ray image. In digital X-ray system, there is a software function with which the user can set a R/L label on the X-ray image for a right (R) body part or a left (L) body part. Digital X-ray systems have a software function that allows a side mark or a label to be placed on the X-ray image, especially by placing a virtual marker or virtual label on the X-ray image. This is a manual step which requires the knowledge and the decision by the user who determines the right side or the left side. Usually, this is done using a digital marker and not anymore using a lead marker as it was especially common in analog X-ray systems. In analog systems, a lead marker is placed close to the body part and is then shown on the X-ray image.

The document CN110946597A discloses an X-ray photographing apparatus and method. The X-ray photographing apparatus includes: an X-ray tube that projects X-rays within an X-ray imaging range; an X-ray image generation unit that generates an X-ray image; an image acquisition unit that acquires an optical photographic image with an image of a subject on the optical photographic image when a predetermined condition occurs; a recognition unit that recognizes a key point of the object to be inspected on the optical photographic image; and the positioning unit is used for determining the left side direction and the right side direction which need to be marked on the X-ray image according to the relation between a part of the key points and the X-ray photographing range.

SUMMARY

One or more example embodiments of the present invention reduce the attention required by marking the left side and the right side, thereby improving the efficiency, and reducing the errors of manual marking.

In X-ray imaging, left and right labels are used for paired organs such as hands and knees because it is difficult to identify the left and right laterality of an organ or a body part in X-ray images. However, the above X-ray systems fail to provide a reliable labeling of the body part, especially if the body part is covered by e.g. a cloth. Other sources of complications can be some special situations, e.g. after an accident, the view position might be different to what was originally planned (e.g. p.a. instead of a.p.). In X-ray examinations during a surgery, a body part might not be properly positioned or very pathological. The inventors acknowledged that a covered body part and/or manual labelling are a source for errors in labeling the body part. In general, X-ray imaging is driven by reaching high patient throughput and low costs which might also lead to several erroneous labels on X-ray images.

One or more example embodiments of the present invention provide a method for providing a label of a body part on an X-ray image which is useful for a reliable labeling of the body part.

According to one or more example embodiments, a computer-implemented method for providing a label of a body part on an X-ray image, comprises receiving input data, wherein the input data is based on a red, green and blue (RGB) image of the body part, a depth image of the body part and an X-ray image of the body part; applying at least one trained function to the input data to generate output data, wherein the output data is the label of the body part, the label indicating a right body part or a left body part; and providing the output data.

According to one or more example embodiments, the input data comprises at least one of context information or shape information derived from the RGB image, shape information derived from the depth image, or skeleton structure information derived from the X-ray image.

According to one or more example embodiments, the input data is from at least two of the RGB image, the depth image or the X-ray image.

According to one or more example embodiments, the input data is only from the RGB image, the depth image or the X-ray image.

According to one or more example embodiments, the applying applies a plurality of trained functions to the input data to generate output data associated with at least one of the RGB image, the depth image or the X-ray image.

According to one or more example embodiments, a consensus protocol provides total output data based on the associated output data.

According to one or more example embodiments, the method further includes providing a manual confirmation notification or a manual correction notification.

According to one or more example embodiments, the trained function is based on a machine learning algorithm.

According to one or more example embodiments, the trained function is based on a rule-based model.

According to one or more example embodiments, the providing includes displaying the label as an overlay on the X-ray image.

According to one or more example embodiments, the body part is a paired body part.

According to one or more example embodiments, a computer-implemented method for providing a trained function for an X-ray system, comprises receiving input training data, wherein the input training data is based on a red, green and blue (RGB) image of the body part, a depth image of the body part and an X-ray image of the body part; receiving output training data, wherein the output training data is related to the input training data, wherein the output training data is a label of the body part, the label indicating a right body part or a left body part; training a trained function based on the input training data and the output training data; and providing the trained function.

According to one or more example embodiments, an X-ray system comprises a first interface configured to receive input data, wherein the input data is based on a red, green and blue (RGB) image of a body part, a depth image of the body part and an X-ray image of the body part; a computation unit configured to apply at least one trained function to the input data and generate output data, wherein the output data is a label of the body part indicating a right body part or a left body part; and a second interface configured to provide the output data.

According to one or more example embodiments, a computer-readable medium comprises instructions which, when executed by a computer, cause the computer to carry out the method of one more example embodiments.

BRIEF DESCRIPTION OF THE DRAWINGS

Further objects and advantages of the present invention will be apparent from the following description of the preferred embodiments of the invention as illustrated in the accompanying drawings, in which.

DETAILED DESCRIPTION

In the following, solutions according to one or more example embodiments of the present invention are described with respect to the claimed x-ray system and training system as well as with respect to the claimed methods. Features, advantages or alternative embodiments herein can be assigned to the other claimed objects and vice versa. In other words, claims for the x-ray system and the training system can be improved with features described or claimed in the context of the methods. In this case, the functional features of the method are embodied by objective units of the x-ray system or the training system.

Furthermore, one or more example embodiments of the present invention is described with respect to methods and systems for providing a label of the body part as well as with respect to methods and systems for providing a trained function. Features, advantages or alternative embodiments herein can be assigned to the other claimed objects and vice versa. In other words, claims for methods and systems for providing a trained function can be improved with features described or claimed in context of the methods and systems for providing a label of the body part, and vice versa.

In particular, the trained function of the methods and systems for providing a label of the body part can be adapted by the methods and systems for providing a trained function.

Furthermore, the input data can comprise advantageous features and embodiments of the training input data, and vice versa. Furthermore, the output data can comprise advantageous features and embodiments of the output training data, and vice versa.

One or more example embodiments of the present invention relate to a computer-implemented method for providing a label of a body part on an X-ray image, comprising the following steps: In a first step, input data is received, in particular with a first interface, wherein the input data is based on an RGB image of the body part, a depth image of the body part and an X-ray image of the body part. In another step, at least one trained function is applied to the input data, in particular with a computation unit, wherein output data is generated, and wherein the output data is a label of the body part indicating the right body part or the left body part. In another step, the output data is provided, in particular with a second interface.

The X-ray system for acquiring the X-ray image comprises an X-ray source and an X-ray detector. The body part or examination region is positioned in an interspace between the X-ray source and the X-ray detector. Furthermore, the X-ray system may comprise an optical measurement system, e.g. a 2D camera or, preferably, a 3D camera. The optical measurement system can acquire an optical image of the body part. The optical measurement system can be located within the examination room separate from the X-ray system. As alternative, the optical measurement system can be included in the X-ray system. Preferably, the optical measurement system can be arranged next to the X-ray source, e.g. attached to the side of the collimator. The optical image can comprise an RGB image, which could also mean a greyscale image. The RGB image can be acquired with a 2D camera or a 3D camera. Besides that, the optical image can comprise a depth image, especially with a 3D camera or any other imaging device for depth images.

The input data is based on an RGB image of the body part, a depth image of the body part and an X-ray image of the body part. The input data can comprise the RGB image of the body part, the depth image of the body part and the X-ray image of the body part. The input data can comprise information, characteristics or parameters based on the RGB image of the body part, the depth image of the body part and the X-ray image of the body part. The input data can comprise e.g. distances of landmarks determined based on the RGB image of the body part, the depth image of the body part and the X-ray image of the body part.

In another step, at least one trained function is applied to the input data with a computation unit, wherein output data is generated. The computation unit can be part of the X-ray system or any connected system, e.g. a reading station. The output data is a label of the body part indicating the right body part or the left body part. In general, a trained function mimics cognitive functions that humans associate with other human minds. In particular, by training based on training data the trained function can adapt to new circumstances and to detect and extrapolate patterns.

In general, parameters of a trained function can be adapted by training. In particular, supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Q-learning, genetic algorithms and/or association rules. In particular, a neural network can be a deep neural network, a convolutional neural network or a convolutional deep neural network. Furthermore, a neural network can be an adversarial network, a deep adversarial network and/or a generative adversarial network.

The inventors propose an automatic procedure to set the R/L label. By using an automatic setting of the R/L label, a manual step can be avoided. This avoids swapping left and right in a beneficial way. The automatic setting or providing of the label is based on applying a trained function to the input data. E.g. the label can be determined based on the anatomy of the body part depicted in the X-ray image. The anatomy or laterality of the body part can be identified by the trained function.

In another step, the output data is provided, e.g. with a second interface. The label of the body part comprises the information of left body part or right body part. The label can be stored together with the X-ray image, e.g. in a DICOM data set. The label can be shown as an overlay on the X-ray image. The label can be shown in a region of the graphical user interface. The label can be visualized as a character, e.g. R or L. The label can be visualized in the form of a symbol, e.g. a symbol depicting a human, in particular standing, body or body shape with the left body part or right body part marked within the symbol, e.g. by a different color. The shape of the body can be grey and the left body part or the right body part can be colored red, green, blue, orange, white, black or any other color than the gray shade of the body shape.

With this solution, there is no manual setting of an R/L label necessary by the user. The benefit can be a faster setting of the label. Another benefit can be one manual step less in the X-ray procedure. A reduction of errors, e.g. confusing of left and right body part, can be achieved. With the support of a camera, unusual situations can be handled, and errors can be reduced. Instead of a manual setting, the label can be set automatically. The label can be set based on an analysis of the X-ray image instead of a recollection of the positioning of the patient, especially the body part.

According to one or more example embodiments of the present invention, the input data comprises at least one of: context information or shape information derived from the RGB image,
shape information derived from the depth image, skeleton structure information derived from the X-ray image.

Further sources of input data can be based on the use of other sensing techniques like an infrared detector or a temperature detector to locate the patient. Moreover, active modules on the patient can be used to send location information, e.g. sensors based on Bluetooth low energy proximity sensing. An analysis of X-ray system parameters, e.g. table position or X-ray tube position, can be determined from log-files. An analysis of the location and position of a portable detector can be used in case of free exposures. The further information can be used to further improve the method.

The context information can be derived from the RGB image. The context information can comprise information e.g. about neighboring body parts, anatomical structures, or orientation of the patient. The shape information can be derived from the RGB image. The shape information can comprise an outline or contour of the body part or examination region. The shape information based on the RGB image can be a two-dimensional information.

The shape information can be derived from the depth image. The shape information based on the depth image can be combined with the shape information or context information based on the RGB image. The shape information derived from the depth image can comprise a three-dimensional information. The shape information derived from the depth image can comprise information concerning a three-dimensional contour of the body part.

Skeleton structure information can be derived from the X-ray image. Information on anatomical structures can comprise skeleton structure information. Skeleton structure information can be derived from the X-ray image based on the absorption values. Known methods or algorithms can be used to determine context information or shape information derived from the RGB image, shape information derived from the depth image, or skeleton structure information derived from the X-ray image.

According to one or more example embodiments of the present invention, the trained function is applied to the input data sourced from at least two data sources from the group of the RGB image, the depth image and the X-ray image. For especially improved results, more than one data source can be used. The reliability of the output data can be improved. As example, the following combinations can be used: RGB image and depth image, RGB image and X-ray image, depth image and X-ray image.

Information based on the X-ray image can provide details about a pose and an orientation of the patient, e.g. based on the face or the body part itself. Information based on the depth image can provide details about three-dimensional orientation and/or three-dimensional contours of the body part and neighboring body regions. Information based on the X-ray image can provide details about anatomic structure and/or skeleton information. Especially, in case of a hidden body part, e.g. covered by a cloth, the X-ray image can provide reliable information which can be preferably combined with information based on the RGB image and/or the depth image.

According to an aspect of the present invention, the trained function is applied to the input data sourced only from the RGB image, the depth image, or the X-ray image. In an embodiment, only one data source is used as input for the trained function.

In a preferred embodiment, only the X-ray image is used as input data. In this embodiment, a camera is not necessary, e.g. in a simple X-ray system, or in case the RGB image or the depth image is erroneous.

In a simple embodiment, anatomical structures of a body part can be recognized for an X-ray acquisition or in an X-ray image. Based on the anatomical structures the left body part or the right body part can be determined based on the X-ray image. The information determined based on the X-ray image can be an output data. The trained function can be adapted to detect positions of bones or other anatomical structures.

For an examination of a knee (a.p.), the patient is lying on his back and has legs straight. Signs to distinguish left from right can be derived based on the position of fibula and tibia. An overlap of fibula and tibia can be detected. If the fibula is located left from tibia, a right knee can be shown in the X-ray image. If the fibula is located right from tibia, a left knee can be shown in the X-ray image.

For an examination of a forearm (a.p.), the patient can be sitting on a table with the back of the hand lying on the table. Signs to distinguish left from right can be derived based on the position of radius and ulna. The radius and the ulna can be detected, and it can be determined, if radius or ulna is on top. If the ulna is on top, a left arm can be shown in the X-ray image. If the radius on top, a right arm can be shown in the X-ray image.

For an examination of a shoulder (a.p.), the patient can be standing with his or her back to a wallstand of the X-ray system. Signs to distinguish left from right can be derived based on the position of a position of the humerus. If the humerus is shown on the left side, a right shoulder can be shown. If the humerus is shown on the right side, a left shoulder can be shown.

According to an aspect of the present invention, a plurality of trained functions is applied to the input data, and wherein separate output data is generated for the RGB image, the depth image and/or the X-ray image.

A first trained function can be provided for applying to the RGB image. A first trained function can be applied to the RGB image, wherein first output data can be generated. Preferably, the first trained function can be an AI based trained function or a trained function based on machine learning.

A second trained function can be provided for applying to the depth image. A second trained function can be applied to the depth image, wherein second output data can be generated. Preferably, the second trained function can be an AI based trained function or a trained function based on machine learning.

A third trained function can be provided for applying to the X-ray image. A third trained function can be applied to the X-ray image, wherein third output data is generated. Preferably, the third trained function can be based on a rule-based model.

The first output data, the second output data and the third output data can be separate output data. The first output data, the second output data, and/or the third output data can be a label of the body part indicating the right body part or the left body part.

According to an aspect of the present invention, a consensus protocol provides total output data based on the separate output data. At least two of the first output data, the second output data and the third output data can be used to determine a total output data. The total output data can be defined as output data.

The inventors propose to combine the results of multiple independent algorithms or a plurality of trained functions. A consensus protocol can be used to get an accurate label or output data. A consensus protocol can provide an output for different situations or clinical applications.

The output data, also referred to as final L/R label, can be based on the first output data, the second output data, and the third output data, e.g. the results of three models or the plurality of trained functions, using a consensus protocol. Especially, (only) in case the first output data, the second output data, and the third output data match, the automatic labeling is applied. Otherwise, the user is informed to set the label manually or confirm the suggestion by the algorithm or proposed method.

A first trained function can be applied to the RGB image, wherein first output data is generated. Context information and/or shape information can be derived from the RGB image. The first trained function can be applied to the RGB image and/or the context information and/or the shape information. A first output data can be a label of the right body part or the left body part.

A second trained function can be applied to the depth image, wherein second output data is generated. Shape information can be derived from the depth image. The second trained function can be applied to the depth image and/or the shape information. The second output data can be a label of the right body part or the left body part.

The third trained function can be applied to the X-ray image, wherein third output data is generated. Skeleton structure information can be derived from the X-ray image. The third trained function can be applied to the X-ray image and/or the skeleton structure information. The third output data can be a label of the right body part or the left body part.

The first output data, the second output data, and the third output data can be collected in a results pool. A consensus protocol can be applied to the results pool, or, more specifically, the first output data, the second output data and the third output data. If agreement is achieved, the output data or the label can be determined automatically. If agreement is not achieved, the output data or the label can be determined with lower accuracy or no output could be given at all. A suggestion to the user can be offered. A manual input or confirmation by the user can be used.

Further information can be used in addition and collected in the results pool to further improve the method. A consensus protocol can be applied to the results pool including further information. Further sources of input data can be based on the use of other sensing techniques like an infrared detector or a temperature detector to locate the patient. Moreover, active modules on the patient can be used to send location information, e.g. sensors based on Bluetooth low energy proximity sensing. An analysis of X-ray system parameters, e.g. table position or X-ray tube position, can be determined from log-files. An analysis of the location and position of a portable detector can be used in case of free exposures.

A 3D camera can be mounted in the examination room or at the X-ray system. The 3D camera can be used to capture the RGB image and the depth image. An AI model or the first trained function can provide the first output data based on the context and shape information in RGB image. An AI model or the second trained function can provide the second output data based on the shape information in depth image.

The X-ray image can be captured at the same time together with the RGB image and/or the depth image, or at a different time, e.g. shortly before or after the X-ray image is acquired. A rule-based model can be applied to the X-ray image and third output data can be generated.

According to an aspect of the present invention, manual confirmation or manual correction is suggested. Especially in case of total output data and/or multiple data sources, manual confirmation or manual correction by the user can be used. The user can be notified, e.g. by way of optical, acoustical, or haptical means. In a preferred embodiment, a message is displayed on a screen or touch screen. An option for input and/or confirmation of a proposed label, the output data, is provided, e.g. on the screen or touch screen. An accuracy of output data can be determined and, preferably, displayed to the user. The user can input a value, e.g. a character (R or L), e.g. by an input interface. The user can select an option, e.g. by an input interface.

According to an aspect of the present invention, the trained function is based on a machine learning algorithm. The trained function can be embodied as machine learning algorithm, deep learning algorithms or similar methods. Preferably, the trained function can be trained by supervised learning, especially using annotated input training data and output training data. A higher level of accuracy of the label can be advantageously facilitated.

According to an aspect of the present invention, the trained function is based on a rule-based model. The rule-based model can be based on a set of features. For example, the rule-based model can be used for the X-ray image. The features can be based on anatomical or skeletal structures and their orientation. A higher level of accuracy of the label can be advantageously allowed.

According to an aspect of the present invention, the label is displayed in conjunction with the X-ray image, in particular the label is displayed as an overlay on the X-ray image. The X-ray image and the label can be displayed on a screen or a similar display unit. The X-ray image with the overlaid label can offer a similar impression as known from a lead marker. In addition, an accuracy for the label can be displayed. Furthermore, a checkmark, another symbol, or a text string can be displayed offering information about a confirmation of the user. An information about a manual input of the label can be displayed, e.g. by a symbol or text string. As advantage, the user or a reader of the image can easily grasp information about the reliability or accuracy of the label.

According to an aspect of the present invention, the body part is a paired body part, in particular an extremity. For example, the body part can be a hand, an elbow, an arm, a shoulder, a hip, a leg, a knee, or a foot. Paired body parts can come along with the risk of confusing the right body part and the left body part in X-ray images. The inventive method can reduce the errors during labeling.

One or more example embodiments of the present invention further relates to a computer implemented method for providing a trained function for an X-ray system, comprising:
  receiving input training data, in particular with a first training interface, wherein the input training data is based on an RGB image of the body part, a depth image of the body part and an X-ray image of the body part,
  receiving output training data, in particular with a second interface, wherein the output training data is related to the input training data, wherein the output training data is a label of the body part indicating the right body part or the left body part,
  training a trained function based on the input training data and the output training data, in particular with a training computation unit, and
  providing the trained function, in particular with a third training interface.

The input training data and the output training data can be collected, especially from exams with high quality annotations, e.g. supervised by a user inspecting the RGB image, the depth image and the X-ray image. Further confirmed input data and output data, as described above, can be added as further input training data and output training data to further improve the trained function over time. The trained function be pre-trained or untrained. The trained function can be trained based on the input training data and the output training data. The training can be based on common machine learning methods or deep learning methods. A reliable labelling of X-ray images can be provided.

One or more example embodiments of the present invention further relates to an X-ray system comprising:
  a first interface, configured for receiving input data, wherein the input data is based on an RGB image of the body part, a depth image of the body part and an X-ray image of the body part,
  a computation unit, configured for applying at least one trained function to the input data with a computation unit, wherein output data is generated, and wherein the output data is a label of the body part indicating the right body part or the left body part, and
  a second interface, configured for providing the output data.

The X-ray system can be embodied as a radiography system, a fluoroscopy system, an angiography system, a mammography system, or a CT scanner. Preferably, the X-ray system is embodied as a radiography system or, a fluoroscopy system. In a preferred embodiment, the system comprises an optical measurement system, e.g. a 2D or 3D camera. Preferably, the X-ray system comprises a 3D camera or a similar device for acquiring three-dimensional images or depth images.

The X-ray system can comprise a training system for training the trained function. As alternative, the training system can be embodied separately from the X-ray system, e.g. the training can be performed before shipping of the X-ray device in the factory. The trained function can be transferred to the computation unit of the X-ray device. The first interface and the second interface can be a single physical interface, e.g. a network interface or a user interface. The first interface and the second interface can be subunits of the interface.

One or more example embodiments of the present invention further relates to a computer program product comprising instructions which, when the program is executed by a computer, cause the computer to carry out the method for providing a label of a body part on an X-ray image according to one or more example embodiments of the present invention. Preferably, the X-ray system comprises the computer. The program code can be loadable to a memory unit of the X-ray system. The program code can be carried out in the computer to perform the steps of the method for providing a label of a body part on an X-ray image according to one or more example embodiments of the present invention. One or more example embodiments of the present invention further relates to a computer-readable medium comprising instructions which, when executed by a computer, cause the computer to carry out the method for providing a label of a body part on an X-ray image according to one or more example embodiments of the present invention.

One or more example embodiments of the present invention further relates to a method for providing a label of a body part on an X-ray image according to one or more example embodiments of the present invention, wherein the trained function was provided by the method for providing a trained function for an X-ray system according to one or more example embodiments of the present invention.

One or more example embodiments of the present invention further relates to a method for providing a label of a body part on an X-ray image, comprising:
  receiving input data, in particular with a first interface, wherein the input data is based on an RGB image of the body part, a depth image of the body part and an X-ray image of the body part,
  applying at least one trained function to the input data, in particular with a computation unit, wherein output data is generated, and wherein the output data is a label of the body part indicating the right body part or the left body part, providing the output data, in particular with a second interface,
  wherein the trained function was provided by a method for providing a trained function for an X-ray system, comprising: receiving input training data, in particular with a first training interface, wherein the input training data is based on an RGB image of the body part, a depth image of the body part and an X-ray image of the body part, receiving output training data, in particular with a second interface, wherein the output training data is related to the input training data, wherein the output training data is a label of the body part indicating the right body part or the left body part, training a trained function based on the input training data and the output training data, in particular with a training computation unit, and providing the trained function, in particular with a third training interface.

One or more example embodiments of the present invention further relates to a training system comprising:

a first training interface, configured for receiving input training data, wherein the input training data is based on an RGB image of the body part, a depth image of the body part and an X-ray image of the body part, a second training interface, configured for receiving output training data, wherein the input training data is related to the output training data, wherein the output training data is a label of the body part indicating the right body part or the left body part, a training computation unit, configured for training a trained function based on the input training data and the output training data, and a third training interface, configured for providing the trained function.

The training system can be part of the X-ray system. As alternative, the training system can be a separate training system. In case of a pre-trained (trained) function, a connection to the X-ray system can be provided for further input data. The first, second and/or third training interface can be subunits of a single interface. The first, second, and third interface can be a, in particular single, physical interface, e.g. a network interface or a user interface.

One or more example embodiments of the present invention further relates to a computer program product comprising instructions which, when the program is executed by a computer, cause the computer to carry out the method for providing a trained function according to one or more example embodiments of the present invention. The computer can be part of the training system. One or more example embodiments of the present invention further relates to A computer-readable medium comprising instructions which, when executed by a computer, cause the training system to carry out the method for providing a trained function according to one or more example embodiments of the present invention.

The present invention will be further described in detail in conjunction with the accompanying drawings and embodiments. It should be understood that the particular embodiments described herein are only used to illustrate the present invention but not to limit the present invention.

Figure 1:
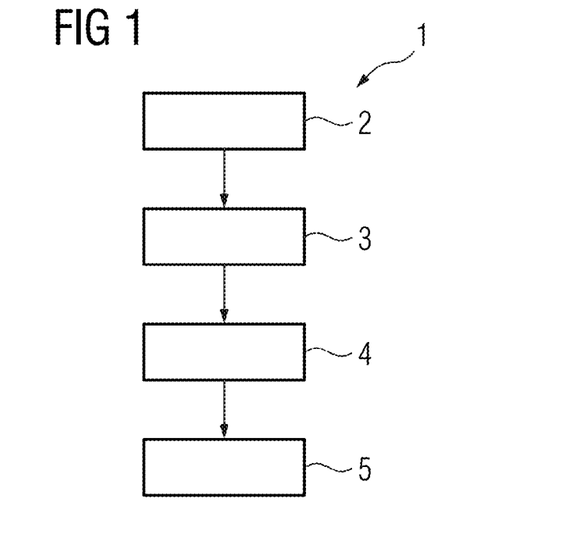
FIG. 1 is an exemplary illustration of a method for providing a label of a body part on an X-ray image to one or more example embodiments of the present invention.

FIG. 1 shows an exemplary embodiment of the method 1 for providing a label of a body part on an X-ray image according a first embodiment of one or more example embodiments of the present invention. The method comprises the following steps: In the step of receiving 2, input data is received with a first interface. The input data is based on an RGB image of the body part, a depth image of the body part and an X-ray image of the body part. The input data comprises at least one of context information or shape information derived from the RGB image, shape information derived from the depth image, and skeleton structure information derived from the X-ray image. In the step of applying 3, at least one trained function is applied to the input data with a computation unit, wherein output data is generated. The trained function is applied to the input data sourced from at least two data sources from the group of the RGB image, the depth image and the X-ray image. The output data is a label of the body part indicating the right body part or the left body part. The body part is a paired body part, in particular an extremity. In the step of providing, the output data is provided, e.g. with a second interface. In a step of displaying 5, the output data is displayed, e.g. on a screen or touch screen. The first interface and the second interface can be a single interface, e.g. a network interface or a user interface.

Figure 2:
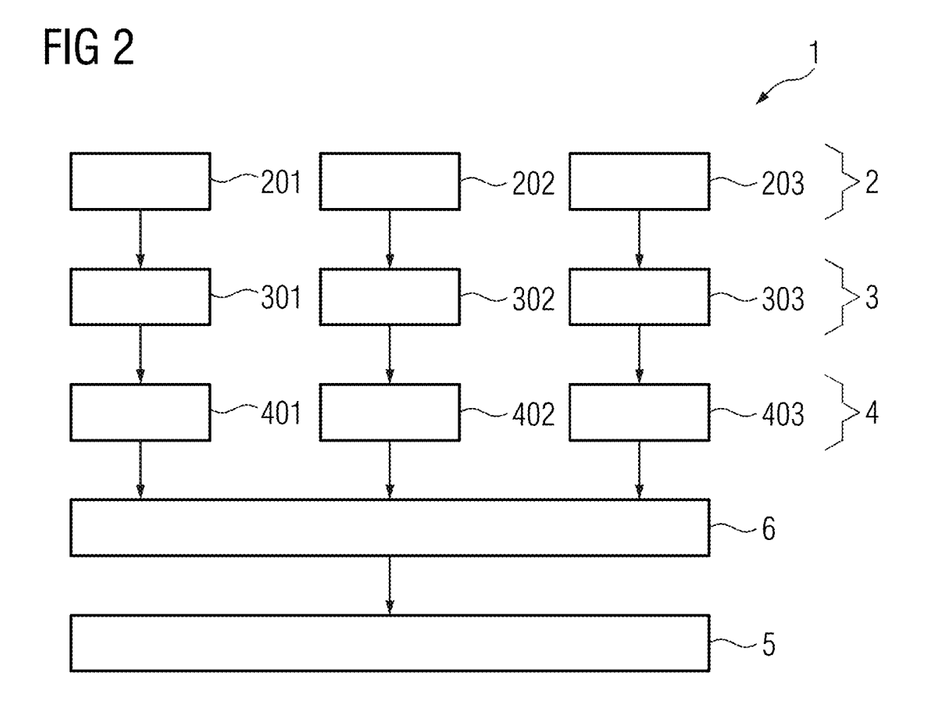
FIG. 2 is an exemplary illustration of a method for providing a label of a body part on an X-ray image to one or more example embodiments of the present invention.

FIG. 2 shows an exemplary embodiment of the method 1 for providing a label of a body part on an X-ray image according to a second embodiment of the invention. The step of receiving 2 comprises the steps of receiving the RGB image 201, receiving the depth image 202, and receiving the X-ray image 203. The step of applying 3 comprises the steps of applying first trained function 301, applying second trained function 302, and applying third trained function 303. The step of providing 4 comprises the steps of providing first output data 401, providing second output data 402, and providing third output data 403.

A plurality of trained functions is applied to the input data, and wherein separate output data is generated for the RGB image, the depth image and the X-ray image. Each trained function can be applied to the input data sourced only from the RGB image, the depth image or the X-ray image.

A first trained function can be provided for applying to the RGB image. Context information and/or shape information can be derived from the RGB image. A first trained function can be applied to the RGB image and/or the context information and/or the shape information in step 301, wherein first output data can be generated. Preferably, the first trained function can be an AI based trained function or a trained function based on machine learning. First output data is provided in step 401.

A second trained function can be provided for applying to the depth image. Shape information can be derived from the depth image. A second trained function can be applied to the depth image and/or the shape information in step 302, wherein second output data can be generated. Preferably, the second trained function can be an AI based trained function or a trained function based on machine learning. Second output data is provided in step 402.

A third trained function can be provided for applying to the X-ray image. Skeleton structure information can be derived from the X-ray image. A third trained function can be applied to the X-ray image and/or the skeleton structure information in step 303, wherein third output data is generated. Preferably, the third trained function can be based on a rule-based model. Third output data is provided in step 403.

The first output data, the second output data and the third output data can be separate output data. The first output data, the second output data, and/or the third output data can be a label of the body part indicating the right body part or the left body part.

The first, second and third output data can be merged in a data pool. In step 6, a consensus protocol provides total output data based on the separate output data. At least two of the first output data, the second output data and the third output data can be used to determine total output data. The total output data can be defined as output data. The results of multiple independent algorithms or a plurality of trained functions are combined.

Preferably, the first, second and third output data are used to determine total output data. The output data, also referred to as final L/R label, can be based on the first output data, the second output data, and the third output data, e.g. the results of three models or the plurality of trained functions, using a consensus protocol. Especially, in case the first output data, the second output data, and the third output data match, the automatic labeling is applied. Otherwise, the user is informed to set the label manually or confirm the suggestion by the algorithm or proposed method.

The first output data, the second output data, and the third output data can be collected in a results pool. A consensus protocol 6 can be applied to the results pool, or, more specifically, the first output data, the second output data and the third output data. If agreement is achieved, the output data or the label can be determined automatically. If agreement is not achieved, the output data or the label can be determined with lower accuracy or no output could be given at all. A suggestion to the user can be offered. A manual input or confirmation by the user can be required or suggested. The label is displayed in conjunction with the X-ray image in step 5, in particular the label is displayed as an overlay on the X-ray image.

Figure 3:
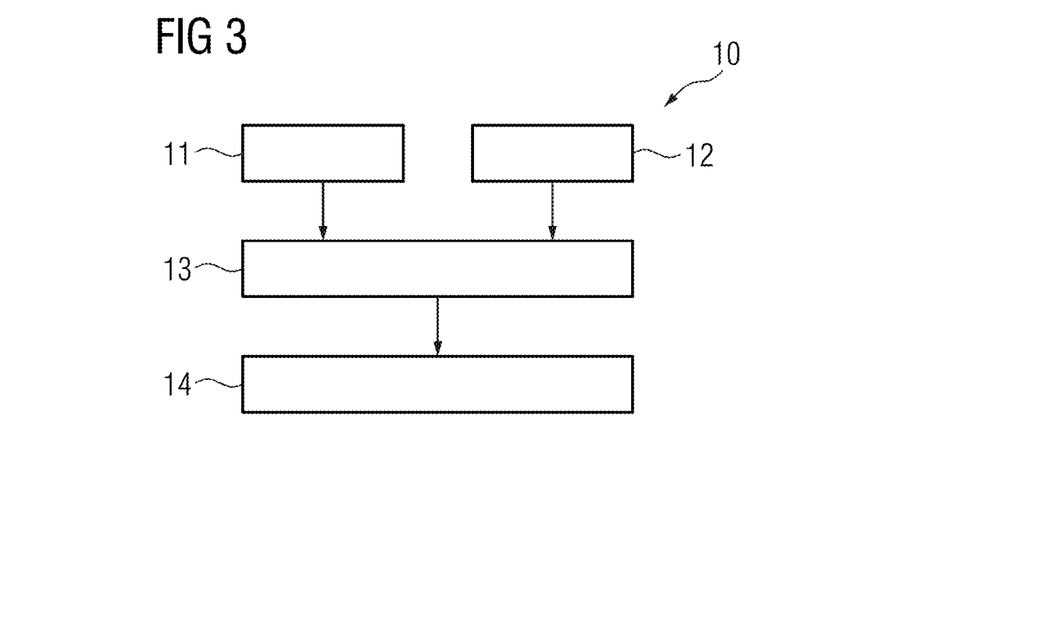
FIG. 3 is an exemplary illustration of a method for providing a trained function for an X-ray system according to one or more example embodiments of the present invention.

FIG. 3 shows an exemplary embodiment of the method 10 for providing a trained function for an X-ray system according to one or more example embodiments of the present invention. The method 10 comprises the following steps: In a first step 11, input training data is received, in particular with a first training interface, wherein the input training data is based on an RGB image of the body part, a depth image of the body part and an X-ray image of the body part. In another step 12, output training data is received, preferably with a second interface, wherein the output training data is related to the input training data, wherein the output training data is a label of the body part indicating the right body part or the left body part. In another step 13, a trained function is trained based on the input training data and the output training data, preferably with a training computation unit. In another step, the trained function is provided, preferably with a third training interface. The first, second and third interface can be a single physical interface, e.g. a network interface or a user interface.

Figure 4:
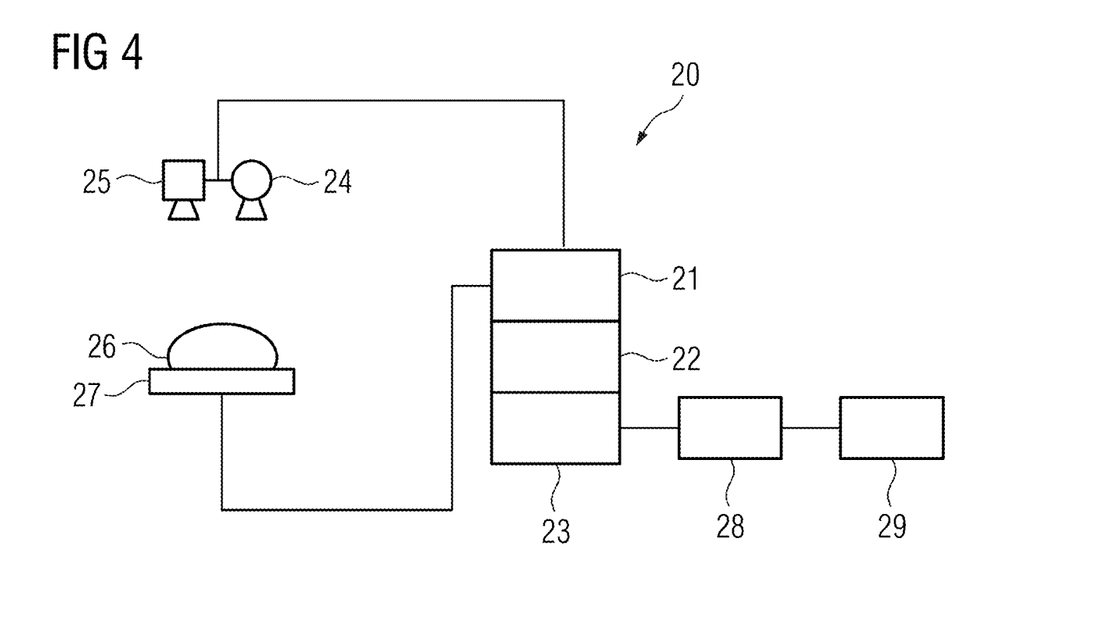
FIG. 4 is an exemplary illustration of an X-ray system according to one or more example embodiments of the present invention.

FIG. 4 shows an exemplary embodiment of the X-ray system 20 according to one or more example embodiments of the present invention. The X-ray system 20 comprises a first interface 21, configured for receiving input data, wherein the input data is based on an RGB image of the body part, a depth image of the body part and an X-ray image of the body part. The X-ray system 20 further comprises a computation unit 22, configured for applying at least one trained function to the input data with a computation unit, wherein output data is generated, and wherein the output data is a label of the body part indicating the right body part or the left body part. The X-ray system 20 further comprises a second interface 23, configured for providing the output data.

The X-ray system 20 is a radiography system or, a fluoroscopy system. The X-ray system 20 comprises an X-ray source 24 and an X-ray detector 27. The patient 26 or the body part is arranged in the interspace between the X-ray source 24 and the X-ray detector 27. The X-ray system 20 comprises a 3D camera 25 or a similar device for acquiring three-dimensional images or depth images. The X-ray source 24, the camera 25, and the X-ray detector 27 are connected to the first interface 21. A display unit 28 and an input interface 29 are connected to the second interface.

The X-ray system can comprise a training system for training the trained function. As alternative, the training system can be embodied separately from the X-ray system, e.g. the training can be performed before shipping of the X-ray device in the factory. The trained function can be transferred to the computation unit of the X-ray device.

Figure 5:
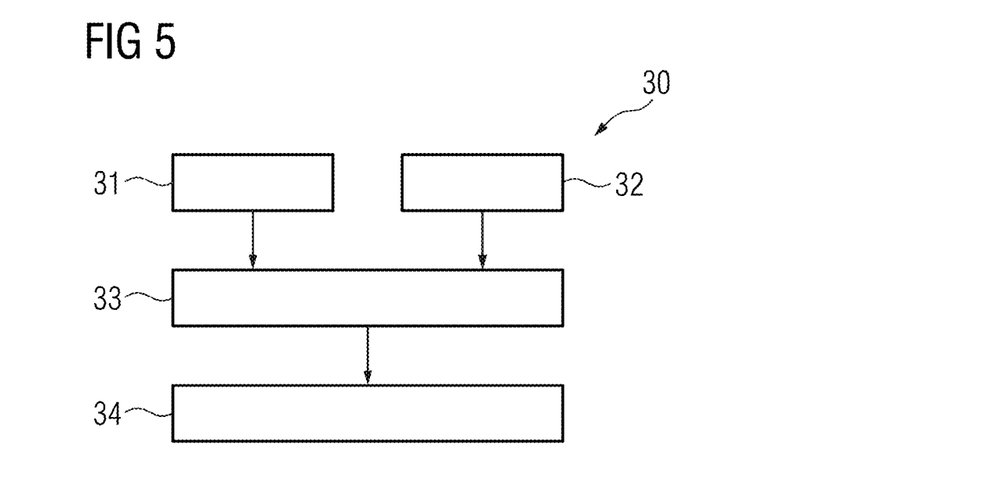
FIG. 5 is an exemplary illustration of a training system according to one or more example embodiments of the present invention.

FIG. 5 shows an exemplary embodiment of the training system 30 according to one or more example embodiments of the present invention. The training system 30 comprises a first training interface 31, configured for receiving input training data, wherein the input training data is based on an RGB image of the body part, a depth image of the body part and an X-ray image of the body part. The training system 30 further comprises a second training interface 32, configured for receiving output training data, wherein the input training data is related to the output training data, wherein the output training data is a label of the body part indicating the right body part or the left body part. The training system 30 further comprises a training computation unit 33, configured for training a trained function based on the input training data and the output training data. The training system 30 further comprises a third training interface 34, configured for providing the trained function.

Figure 6:
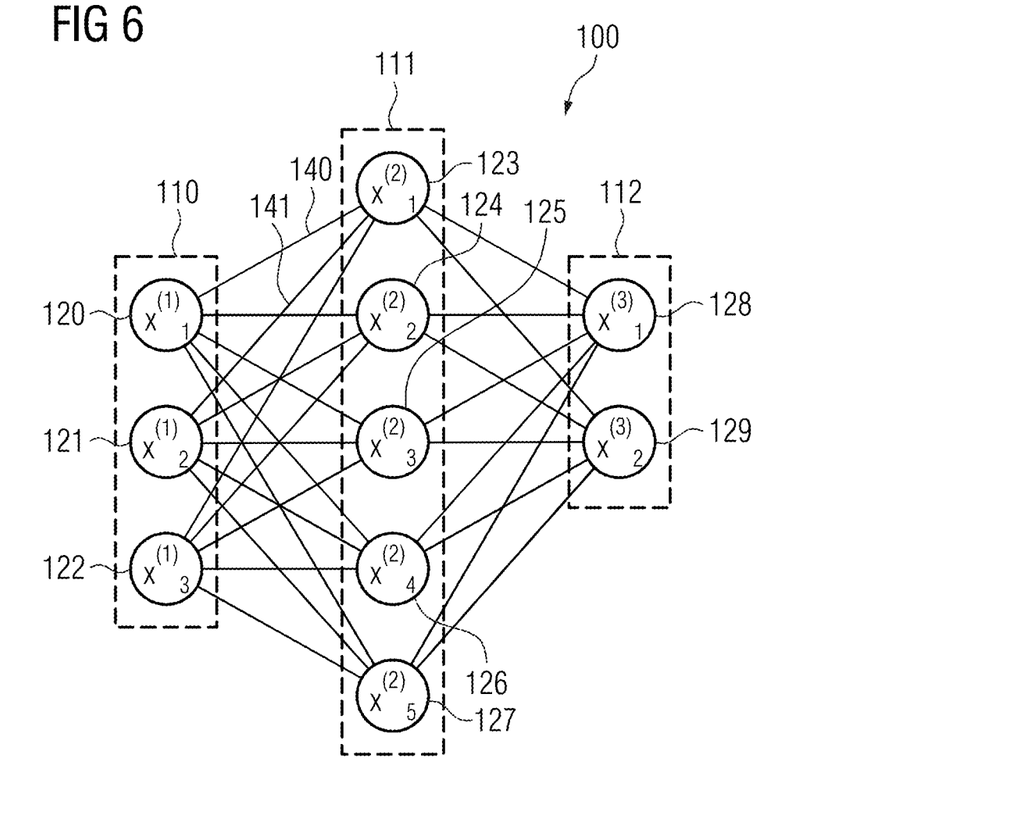
FIG. 6 is an exemplary illustration of a neural network according to one or more example embodiments of the present invention.

FIG. 6 displays an embodiment of an artificial neural network 100. Alternative terms for "artificial neural network" are "neural network", "artificial neural net" or "neural net".

The artificial neural network 100 comprises nodes 120, . . . , 129 and edges 140, 141, wherein each edge 140, 141 is a directed connection from a first node 120, . . . , 129 to a second node 120, . . . , 129. In general, the first node 120, . . . , 129 and the second node 120, . . . , 129 are different nodes 120, . . . , 129, it is also possible that the first node 120, . . . , 129 and the second node 120, . . . , 129 are identical. For example, the edge 140 is a directed connection from the node 120 to the node 123, and the edge 141 is a directed connection from the node 121 to the node 123. An edge 140, 141 from a first node 120, . . . , 129 to a second node 120, . . . , 129 is also denoted as "ingoing edge" for the second node 120, . . . , 129 and as "outgoing edge" for the first node 120, . . . , 129.

In this embodiment, the nodes 120, . . . , 129 of the artificial neural network 100 can be arranged in layers 110, . . . , 112, wherein the layers can comprise an intrinsic order introduced by the edges 140, 141 between the nodes 120, . . . , 129. In particular, edges 140, 141 can exist only between neighboring layers of nodes. In the displayed embodiment, there is an input layer 110 comprising only nodes 120, . . . , 122 without an incoming edge, an output layer 112 comprising only nodes 128, 129 without outgoing edges, and hidden layer 111 in-between the input layer 110 and the output layer 112. In general, the number of hidden layers 111 can be chosen arbitrarily. The number of nodes 120, . . . , 122 within the input layer 110 usually relates to the number of input values of the neural network, and the number of nodes 128, 129 within the output layer 112 usually relates to the number of output values of the neural network. The input data is based on an RGB image of the body part, a depth image of the body part and an X-ray image of the body part, and received by the nodes 120, 121 and 122. E.g. node 120 receives input data based on an RGB image of the body part, node 121 receives input data based on an depth image of the body part, and node 122 receives input data based on an X-ray image of the body part. The output data is provided at nodes 128 and 129. E.g. node 128 provides output referring to a label of the body part indicating the right body part, and node 129 provides output referring to a label of the body part indicating the left body part.

In particular, a (real) number can be assigned as a value to every node 120, . . . , 129 of the neural network 100. Here, x(n)i denotes the value of the i-th node 120, . . . , 129 of the n-th layer 110, . . . , 112. The values of the nodes 120, . . . , 122 of the input layer 110 are equivalent to the input values of the neural network 100, the values of the nodes 128, 129 of the output layer 112 are equivalent to the output value of the neural network 100. Furthermore, each edge 140, 141 can comprise a weight being a real number, in particular, the weight is a real number within the interval [−1, 1] or within the interval [0, 1]. Here, w(m,n)i,j denotes the weight of the edge between the i-th node 120, . . . , 129 of the m-th layer 110, . . . , 112 and the j-th node 120, . . . , 129 of the n-th layer 110, . . . , 112. Furthermore, the abbreviation w(n)i,j is defined for the weight w(n,n+1)i,j.

In particular, to calculate the output values of the neural network 100, the input values are propagated through the neural network. In particular, the values of the nodes 120, . . . , 129 of the (n+1)-th layer 110, . . . , 112 can be calculated based on the values of the nodes 120, . . . , 129 of the n-th layer 110, . . . , 112 by $$x_j^{(n+1)} = f(\Sigma_i x_i^{(n)} \cdot w_{i,j}^{(n)}).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smooth-step function) or rectifier functions. The transfer function is mainly used for normalization purposes.

In particular, the values are propagated layer-wise through the neural network, wherein values of the input layer 110 are given by the input of the neural network 100, wherein values of the hidden layer 111 can be calculated based on the values of the input layer 110 of the neural network, wherein values of the output layer 112 can be calculated based on the values of the hidden layer 111.

In order to set the values w(m,n)i,j for the edges, the neural network 100 has to be trained using training data. In particular, training data comprises training input data and training output data (denoted as ti). For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w'^{(n)}_{i,j} = w_{i,j}^{(n)} - \gamma \cdot \delta_j^{(n)} \cdot x_i^{(n)}$$

wherein γ is a learning rate, and the numbers δ(n)j can be recursively calculated as $$\delta_j^{(n)} = (\Sigma_k \delta_k^{(n+1)} \cdot w_{j,k}^{(n+1)}) \cdot f'(\Sigma_i x_i^{(n)} \cdot w_{i,j}^{(n)})$$

based on δ(n+1)j, if the (n+1)-th layer is not the output layer, and)

$$\delta_j^{(n)} = (x_k^{(n+1)} - t_j^{(n+1)}) \cdot f'(\Sigma_i x_i^{(n)} \cdot w_{i,j}^{(n)})$$

if the (n+1)-th layer is the output layer 112, wherein f' is the first derivative of the activation function, and y(n+1)j is the comparison training value for the j-th node of the output layer 112.

Although some example embodiments of the present invention have been disclosed in the form of preferred embodiments and variations thereon, it will be understood that numerous additional modifications and variations could be made thereto without departing from the scope of example embodiments of the present invention. For the sake of clarity, it is to be understood that the use of "a" or "an" throughout this application does not exclude a plurality, and "comprising" does not exclude other steps or elements. The mention of a "unit", "module" or a "device" does not preclude the use of more than one unit or device.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/ or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module', 'unit', interface' or the term 'controller' may be replaced with the term 'circuit.' The term 'module' and may 'unit' refer to, be part of, or include processor hardware (shared, dedicated, or group) that executes code and memory hardware (shared, dedicated, or group) that stores code executed by the processor hardware.

The module or interface may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices (i.e., storage means). The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention is not limited to the example embodiment described hereintofore. Rather, other variants of the invention can also be derived herefrom by the person skilled in the art, without departing from the subject matter of the invention. In particular, it is furthermore possible to combine all the individual features described in connection with the example embodiment with one another in a different way also, without departing from the subject matter of the invention.

We claim:

1. A computer-implemented method for providing a label of a body part on an X-ray image, comprising:
    receiving input data, the input data being based on at least two among a red, green and blue (RGB) image of the body part, a depth image of the body part or an X-ray image of the body part, the input data including,
        context information or shape information derived from the RGB image, or
        shape information derived from the depth image;
    applying a plurality of trained functions to the input data to generate separate output data associated with the at least two among the RGB image, the depth image or the X-ray image, a total output data being provided by a consensus protocol based on the separate output data, the total output data being the label of the body part, and the label indicating a right body part or a left body part; and
    providing the total output data.

2. The method according to claim 1, wherein the input data comprises:
    the context information or the shape information derived from the RGB image,
    the shape information derived from the depth image, and
    skeleton structure information derived from the X-ray image.

3. The method according to claim 1, further comprising:
    providing a manual confirmation notification or a manual correction notification.

4. The method according to claim 1, wherein at least one among the plurality of trained functions is based on a machine learning algorithm.

5. The method according to claim 1, wherein at least one among the plurality of trained functions is based on a rule-based model.

6. The method according to claim 1, wherein the providing includes displaying the label as an overlay on the X-ray image.

7. The method according to claim 1, wherein the body part is a paired body part.

8. A computer-implemented method for providing a plurality of trained functions for an X-ray system, comprising:
receiving input training data, the input training data being based on at least two among a red, green and blue (RGB) image of a body part, a depth image of the body part and an X-ray image of the body part, the input training data including,
context information or shape information derived from the RGB image, or
shape information derived from the depth image;
receiving separate output training data associated with the at least two among the RGB image, the depth image or the X-ray image, a total output training data being provided by a consensus protocol based on the separate output training data, the total output training data being a label of the body part, and the label indicating a right body part or a left body part;
training a plurality of trained functions based on the input training data and the separate output training data; and
providing the plurality of trained functions.

9. An X-ray system comprising:
a first interface configured to receive input data, the input data being based on at least two among a red, green and blue (RGB) image of a body part, a depth image of the body part or an X-ray image of the body part, the input data including,
context information or shape information derived from the RGB image, or
shape information derived from the depth image;
a computation unit configured to apply a plurality of trained functions to the input data to generate separate output data associated with the at least two among the RGB image, the depth image or the X-ray image, a total output data being provided by a consensus protocol based on the separate output data, the total output data being a label of the body part, and the label indicating a right body part or a left body part; and
a second interface configured to provide the total output data.

10. A non-transitory computer-readable medium comprising instructions which, when executed by a computer, cause the computer to carry out the method of claim 1.

11. A non-transitory computer-readable medium comprising instructions which, when executed by a computer, cause the computer to carry out the method of claim 2.

12. The method according to claim 2, wherein the applying applies the plurality of trained functions to the input data to generate separate output data associated with each among the RGB image, the depth image and the X-ray image.

13. The method according to claim 2, wherein the providing includes displaying the label as an overlay on the X-ray image.

14. The method according to claim 6, wherein the providing includes displaying the label as an overlay on the X-ray image.

15. The method according to claim 1, wherein
the body part is one among a pair of body parts, the pair of body parts including a right paired body part and a left paired body part; and
the plurality of trained functions are configured to determine whether a respective body part is the right paired body part or the left paired body part based on at least one of,
a bone position in the respective body part, or
a shape of the respective body part.

16. The method according to claim 1, further comprising:
capturing the X-ray image using an X-ray detector when the body part is arranged in an interspace between an X-ray source and the X-ray detector; and
displaying the label with the X-ray image on a graphical user interface.

17. The method according to claim 1, wherein the applying applies the plurality of trained functions to the input data to generate separate output data associated with each among the RGB image, the depth image and the X-ray image.

18. The method according to claim 1, wherein
the plurality of trained functions includes a first trained function;
the applying applies the first trained function to the input data based on the RGB image; and
the first trained function is based on a machine learning algorithm.

19. The method according to claim 1, wherein
the plurality of trained functions includes a first trained function;
the applying applies the first trained function to the input data based on the depth image; and
the first trained function is based on a machine learning algorithm.

20. The method according to claim 1, wherein
the plurality of trained functions includes a first trained function;
the applying applies the first trained function to the input data based on the X-ray image; and
the first trained function is based on a rule-based model.

21. The method according to claim 1, wherein
the plurality of trained functions includes a first trained function, a second trained function and a third trained function;
the applying applies
the first trained function to the input data based on the RGB image,
the second trained function to the input data based on the depth image, and
the third trained function to the input data based on the X-ray image;
each of the first trained function and the second trained function is based on a machine learning algorithm; and
the third trained function is based on a rule-based model.

* * * * *